June 8, 1948.
J. H. BRUUN ET AL
2,443,093
METHOD OF ESTERIFICATION
Filed May 28, 1942
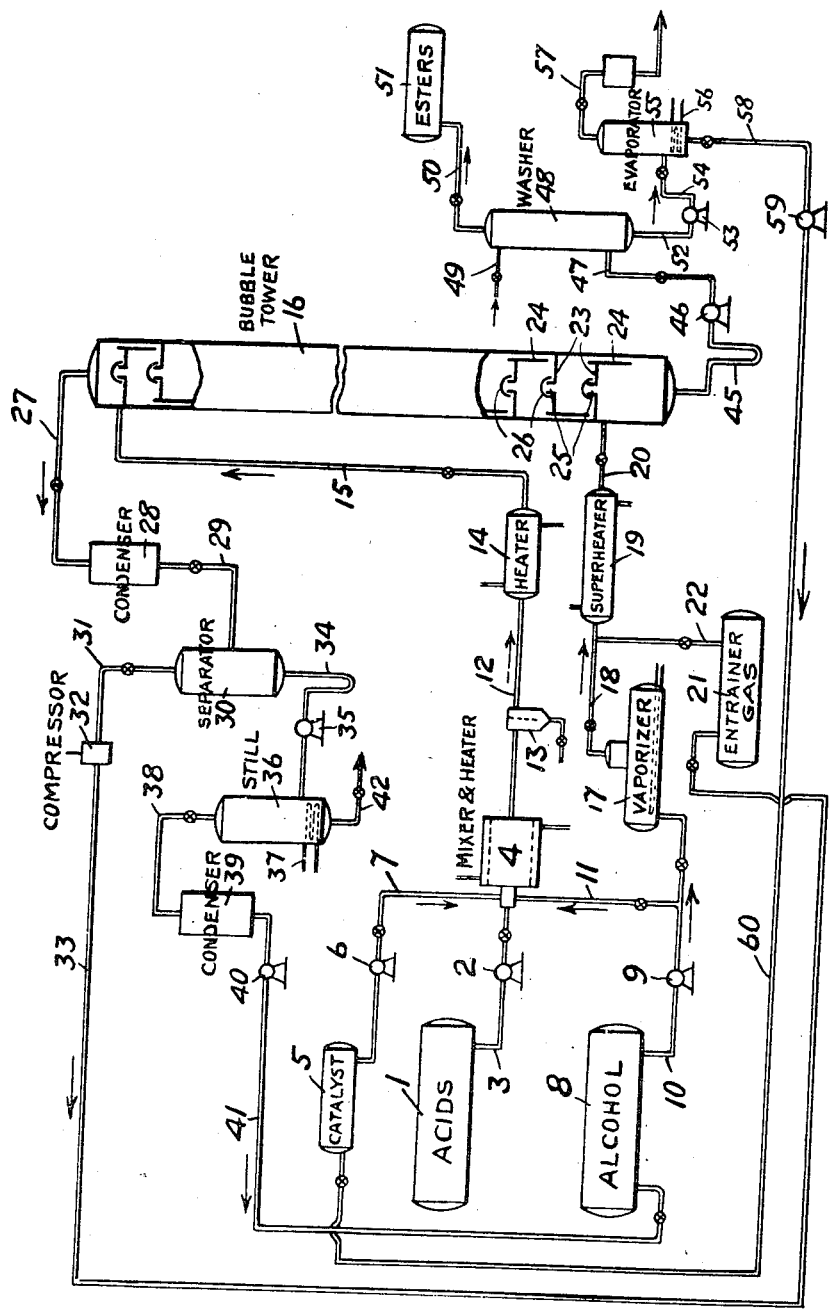
WITNESS:
Rob R Mitchel.
INVENTORS
John Harold Perrine &
Johannes H. Bruun.
BY
Bruun and Harding
ATTORNEYS.

Patented June 8, 1948

2,443,093

UNITED STATES PATENT OFFICE 2,443,093

METHOD OF ESTERIFICATION

Johannes H. Bruun, Swarthmore, and John Harold Perrine, Prospect Park, Pa., assignors to Sun Oil Company, Philadelphia, Pa., a corporation of New Jersey Application May 28, 1942, Serial No. 444,877

7 Claims. (Cl. 260—468)

The present invention relates to a method of producing esters, and is particularly concerned with a novel, continuous, catalytic method of producing esters in which an organic acid is reacted with an alcohol in the presence of a catalyst under such conditions that a much higher than ordinary equilibrium is reached in a very short time, giving a high yield of good quality esters while employing reasonable quantities of reactants and catalysts.

In order to better describe the present invention, there is appended hereto and made a part of this specification, a diagrammatic flow chart of apparatus suitable for practicing the present invention.

Reference should now be made to the drawing. Crude acids to be esterified are withdrawn from storage tank 1 by pump 2 and pumped through valved line 3 to mixer and heater 4 wherein they are mixed with a relatively small amount of catalyst withdrawn from tank 5 by pump 6 and introduced to mixer and heater 4 through valved line 7. The acids and catalyst introduced into mixer and heater 4 may also be mixed therein with a relatively small amount of alcohol withdrawn from tank 8 by pump 9 and introduced into mixer and heater 4 through valved lines 10 and 11. A thorough mixing of the acids, catalyst and alcohol is accomplished in mixer and heater 4 and the mixture is preferably slightly heated during mixing to about 60° F. The mixture from mixer and heater 4 passes therefrom through line 12, having a trap 13 therein for the removal of any sludge formed during the mixing operation and thence flows to heater 14 wherein the mixture is heated to the desired reaction temperature, flowing thence through valved line 15 to the top of bubble cap column 16, the mixture flowing downwardly in liquid phase through the column 16 in the usual manner.

At the same time, the greater portion of the alcohol withdrawn from tank 8 by pump 9 passes through valved line 10 to vaporizer 17 wherein it is vaporized and the vapors withdrawn overhead through valved line 18 and passing to superheater 19, thence through valved line 20 to the bottom of bubble cap column 16, the alcohol vapors rising through the column in the usual manner and bubbling through the liquid on each tray thereof. A suitable quantity of an inert entrainer gas is withdrawn from storage tank 21 through valved line 22 and preferably is introduced into a stream of alcohol vapors, flowing through valved line 18 to superheater 19, the mixed alcohol vapors and entrainer gas being superheated in superheater 19 to the desired reaction temperature and thence being introduced into the bottom of bubble cap column 16 through valved line 20.

The bubble cap column 16 is of usual design and includes a number of trays 23, each adapted to hold a pool of liquid and each tray being provided with a downcomer 24 through which liquid is adapted to overflow from the pool of liquid on the tray to the pool of liquid on the next lower tray; and having a vapor riser 25 capped with bubble cap 26, the vapors bubbling through the liquid on each tray, passing up through the vapor riser 25 on the next higher tray and being forced by bubble cap 26 to pass through the pool of liquid thereon.

From the top of column 16, any unreacted alcohol and all the entrainer gas, together with the water formed during the esterification reaction, are withdrawn through valved line 27 and pass therethrough to condenser 28 wherein the alcohol and water are condensed and liquefied. The mixed liquid and gas from condenser 28 flow through valved line 29 to gas separator 30 wherein the entrainer gas is separated from the water and alcohol, the gas being withdrawn through overhead, valved line 31 by compresser 32 wherein it is recompressed to the desired pressure and discharged therefrom through valved line 33 and returned therethrough to entrainer gas storage tank 21. The alcohol and water are withdrawn from gas separator 30 through trapped line 34 by pump 35 and introduced into suitable apparatus for separating the alcohol from the water, here illustrated as distillation unit 36, wherein the alcohol and water are heated by steam coil 37, the alcohol vaporized and rectified in the upper portion of distillation unit 36 and the alcohol vapors withdrawn overhead through valved line 38 to condenser 39 wherein they are liquefied and are then pumped by pump 40 through valved line 41 back to alcohol storage tank 8 for reuse; the water being withdrawn from distillation unit 36 through valved line 42 and removed therethrough from the system.

From the bottom of bubble cap column 16, the product, esters produced by reaction of the acids to be esterified and alcohol in the column, is withdrawn through trapped line 45 by pump 46 and is discharged therefrom through valved line 47. The product withdrawn through line 45 from the bottom of bubble cap column 16 may require some slight purification. For instance, if sulphuric acid is used as the catalyst, the product (esters withdrawn through line 45) will contain sulphuric acid.

In order to complete the description of the present invention, a relatively simple form of purification apparatus is illustrated. This apparatus consists of a washing tank 48 into which, at a point near the bottom thereof, esters and sulphuric acid are introduced through valved line 47, while water may be introduced at a point near the top of tank 48 through valved line 49. The water descends through tank 48 and removes the sulphuric acid therefrom. The esters, washed of sulphuric acid, are removed from the top of tank 48 through valved line 50 and flow therefrom to ester storage tank 51. The wash water with sulphuric acid dissolved therein is removed from the tank 48 through line 52 by pump 53 and introduced through valved line 54 into suitable apparatus for concentrating the acid, here illustrated as a distillation unit 55 in which the water is vaporized by heat from steam coil 56, water vapors removed overhead through valved line 57 and removed from the system while the concentrated sulphuric acid is withdrawn from the bottom of the distillation unit 55 through valved line 58 and pumped by pump 59 through valved line 60 back to catalyst storage tank 5 for reuse.

A preferred method of operating the above described apparatus in practicing the present invention will now be described. The crude acids to be esterified withdrawn from tank 1 are mixed in mixer 4 with the required amount of catalyst. The exact amount of catalyst to be employed will vary considerably with the particular catalyst being used and also with other conditions of operation, particularly the reactants. A great variety of substances have been found to be useful as catalysts in esterification reactions. Any strong mineral acid may be used, sulphuric and hydrochloric acid being the ones most commonly employed. However, it must be borne in mind that any strong acid may cause isomerization or destruction of a tertiary alcohol. Perchloric and phosphoric acids, while somewhat less efficient, are less destructive and may be employed. The sulphonic acids, particularly those containing several carbon atoms, are desirable catalysts on account of their high efficiency, solubility and less destructive action. Boron and silicon fluorides are efficient catalysts. Acid salts, such as monosodium sulfate, and salts of strong acids with weak bases, such as aluminum sulfate, have been employed. Zinc chloride has been found to be superior to other chlorides when used along with hydrochloric or sulphuric acid. Metallic soaps, such as aluminum stearate, cobalt linoleate, lead oleate, magnesium oleate, are also useful catalysts. However, from a commercial point of view, we believe that sulphuric acid is probably most useful and the description which follows will largely be limited to the use of sulphuric acid as a catalyst.

When sulphuric acid is used as a catalyst, we have found that satisfactory results are obtained when an amount of sulphuric acid equal to approximately 3.2 per cent of the weight of the acids to be esterified is employed. In the case of many commercial grades of organic acids which our process is useful for esterifying, particularly those derived from petroleum, either by partial oxidation of fractions of petroleum or those naturally occurring in petroleum, a certain portion of the acids may be readily attacked and tend to form sludge on mixing with sulphuric acid. This sludge may form deposits during the esterification of the acid in the bubble cap column 16 and, in order to minimize or prevent the formation of sludge therein, we prefer to slightly heat the acids and also add a small amount of alcohol, an amount equal to approximately $\frac{1}{10}$ of the acids to be esterified, during the mixing of the acids and catalyst. Any sludge that forms may be removed through trap 13 before the acids are introduced into the top of bubble cap column 16 at such a rate that the desired reaction time will be required for the liquid material to pass therethrough.

The exact reaction time is subject to considerable variation, depending on the catalyst used and the conditions of operation, particularly temperature. We have found a 10° C. rise in temperature approximately doubles the rate of reaction. A temperature of over 100° C. should be employed in order for the esterification reaction to proceed at a reasonable rate, but with temperatures much over 150° C., we have noticed that the product (esters) produced is quite apt to be discolored. Therefore, using sulphuric acid as a catalyst, we have found that a temperature of about 135° C. appears to be about the most satisfactory and at this temperature approximately twenty minutes reaction time is required in order for the desired degree of esterification to take place. Ordinarily, we wish to obtain a product having an acid number of 4 or lower since such a product is suitable for a wide variety of uses in the arts, although at times, and for certain commercial uses, products having an acid number up to approximately 10 may be acceptable.

It should be noted that bubble cap column 16 is employed primarily as a contact apparatus in the present invention in order to insure intimate contact between the acids to be esterified, the alcohol and the catalyst, and is not used as a distillation or fractionating apparatus. However, substantially a uniform temperature is maintained throughout the column, since all the reactants pass through the column without condensation and we preferably employ a column having a large number of trays, 40 or more. The column should be suitably insulated and, if necessary, heated.

The alcohol is introduced into the bottom of the column along with entrainer gas through valved line 20. One of the advantages of our invention is that smaller amounts of alcohol may be used while still completely esterifying the acids in column 16. We have found that no substantial increase in yield is obtained when using our process if the molar ratio of alcohol to acids is increased above 2 moles of alcohol to 1 mole of acids. At this ratio, we obtain about a 97 per cent yield, using a wide variety of entrained gases. Using a molar ratio of alcohol to acids of 3 to 1, we obtain a yield of 98 per cent when no entrainer gas is used. When nitrogen was used as entrainer gas, we obtained a yield of 98.1 per cent; using butane as the entrainer gas, 98.1 per cent; and using propane as entrainer gas, 98.1 per cent. When using a molar ratio of alcohol to acids of 2 to 1, a satisfactory yield could not be obtained and the apparatus did not operate satisfactorily without an entrainer gas. Using nitrogen as an entrainer gas, the yield was 96.4 per cent, with butane 97.3 per cent, and with propane 97 per cent. Thus with a molar ratio of 2 to 1, we obtain a high grade commercial product. With a molar ratio of 1 to 1, we obtained a yield of 94.3 per cent, using either nitrogen or butane as the entrainer gas. This product would be satisfactory for certain commercial uses and could be purified, if a product having a low acid number is desired, by a suitable method; for instance, by washing with sodium carbonate solutions or the equivalent. Also, using a molar ratio of alcohol to acids of 1 to 2, a yield of approximately 50 per cent was obtained. Obviously, this would not be good practice unless the alcohol employed is much more expensive than the acids.

The following specific examples will serve to illustrate the present invention.

*Example 1.*—Acids derived from petroleum by the method disclosed by Terrel, Hughes and Carter, No. 2,056,913, and having an acid number of 176 and an average molecular weight of approximately 316 and containing slightly less than 3 per cent of impurities, namely, hydrocarbons, were thoroughly mixed with 3.2 per cent of the weight of concentrated sulphuric acid and $\frac{1}{10}$ their volume of methyl alcohol, at a temperature of 60° C. A small amount of sludge formed was removed and the mixture was introduced at the top of a 42 plate bubble cap column maintained at 135° C. at such a rate that twenty minutes were required for the material to pass through the column. Methyl alcohol vapors, superheated to 135° C. and having sufficient nitrogen mixed therewith to insure a steady flow of vapors upwardly through the column, the ratio of nitrogen to alcohol vapors being about 1 to 2, were introduced at the bottom of the column. The molar ratio of alcohol to acids introduced into the column was maintained at 2 to 1. The esters withdrawn from bubble cap column through line 45 after purification in the manner described above, had an acid number of 6.4, or a yield of esters equal to 96.4 per cent of the theoretical yield was obtained.

*Example 2.*—With the conditions of operation the same as in Example 1 and using identical materials except substituting butane for the nitrogen, we obtained a product having an acid number of 4.8, or a yield of 97.3 per cent of the theoretical.

*Example 3.*—Using a molar ratio of alcohol to acids of 1 to 1 and using nitrogen as the entrainer gas but with all other materials and conditions being the same as in Example 1, we obtained a yield of esters having an acid number of 10, or a yield of 94.3 per cent of the theoretical.

*Example 4.*—The experiment outlined under Example 3 was repeated using the same proportion of materials and the same reaction conditions except that the time of reaction was increased from twenty minutes to one hour and twenty minutes. The product obtained had an acid number of 6.6, or a yield of 96.2 per cent of the theoretical yield was obtained.

The products obtained in all the above examples were of good color and were of a grade to be commercially acceptable for many uses. Among the uses to which these esters, or their derivatives, may be put are the following: plasticizers for coating compositions; addition agents for lubricants to inhibit corrosion and sludging, to improve film strength and viscosity index, to prevent settling of other additives, as pour-point depressants; insecticides and fungicides; textile lubricants and processing aid; perfume base; demulsifying (phase reversal) agent; lubricants for delicate mechanisms; hydraulic fluid components; addition agents for gasoline to remove carbon and inhibit deposits and as metallic derivatives to improve antiknock properties; sulfurized or chlorinated as extreme pressure agents and with sulphur alone to form cutting oils.

While a preferred embodiment of the invention has been fully described herein, those skilled in the art will be able to make various modifications and changes therein without departing from the spirit and scope of the invention. Certain changes may be necessitated by the particular reactants or catalysts employed. Thus, for example, if hydrochloric acid is used as a catalyst instead of sulphuric acid, the catalyst will necessarily be mixed with the alcohol vapors introduced into the bottom of bubble cap column; since, under the conditions of operation, the catalyst (hydrochloric acid) will be vaporized. Various modifications may also be made in the time and temperature conditions in order to secure optimum conditions for esterification reaction involving other alcohols than methyl alcohol for instance, ethyl, propyl, butyl, amyl alcohols, although the changes which are necessary are relatively minor. Likewise other types of acids may require modification. It should be noted that the present invention is applicable to esterifying a wide range of organic acids, being particularly applicable to the esterification of such acids as are somewhat similar in their physical properties to the fatty acids. The esterifiable acids suited to the practice of the invention are those which have boiling points which are such that the ester formed is higher boiling in presence of the reactants than are one or both of the reactants. We have also obtained excellent results and yields when employing our process to esterify acids which are known to be very difficult to esterify by other known methods. Thus, we have obtained high yields of various esters of benzoic, cinnamic and trimethyl acetic acids. Also, changes may be made in the reaction time and temperature if a product of a somewhat lower quality than the best obtainable by the process is desired. Thus, if the color of the product is immaterial, the temperature may be somewhat increased and the time of reaction shortened; or if a relatively high acid number is not objectionable in the product, the time of reaction may be decreased or the temperature lowered; or conditions may be varied considerably so as to give a yield of relatively low quality esters which may be purified by subsequent treatment to produce high quality esters. However, since high quality esters are obtainable by our process, we do not recommend material variations under the procedure outlined above but prefer to so operate our process as to obtain a high yield of high quality esters.

We claim:

1. In the method of producing esters by reacting an acid and an alcohol at an elevated temperature, one of said reactants and the ester produced having a boiling point above the temperature of reaction in presence of the other reactant and the other of said reactants having a boiling point below the reaction temperature in presence of said one reactant and said ester, the improvement which comprises flowing a stream of said higher boiling reactant in liquid phase downwardly through a reaction zone, flowing a stream of said lower boiling reactant in vapor phase and mixed with an inert entrainer gas through said zone countercurrent to said first mentioned stream, maintaining temperature and pressure conditions in said zone to maintain said first mentioned stream and the ester produced by the esterification reaction in liquid phase but to maintain said second mentioned stream in vapor phase, intimately commingling said streams in said zone in the presence of a catalyst to cause said acid and alcohol to react and produce esters whereby said stream of said lower boiling reactant first contacts a liquid product composed largely of esters and last contacts a liquid product of said unreacted higher boiling reactant withdrawing esters from the lower part of said zone, so regulating the rate of introduction of said higher boiling reactant and the rate of withdrawal of esters so that a period of time for the desired degree of esterification to take place is required for said higher boiling reactant to pass through said zone, and regulating the rate of introduction into said zone of said lower boiling reactant and said inert entrainer gas and the ratio of said lower boiling reactant to said inert entrainer gas so that an excess of said lower boiling reactant passes through said zone unreacted, and withdrawing from the upper part of said zone said excess along with said inert entrainer gas and any water produced in the esterification reaction from said zone.

2. The process defined in claim 1 in which the molar ratio of alcohol to acids is maintained at approximately two to one.

3. The process defined in claim 1 in which the molar ratio of alcohol to acids does not exceed two to one.

4. The process defined in claim 1 in which the stream of acids to be esterified is caused to flow through a series of pools of liquid in the esterification zone, and the alcohol in vapor phase is caused to bubble through said pools of liquid.

5. The process defined in claim 1 in which the temperature maintained in said reaction zone is between 100° C. and 150° C., the molar ratio of alcohol to acids introduced into said esterification zone is maintained at approximately two to one and in which the acids used are recovered from petroleum.

6. In the method of producing esters by reacting an acid and an alcohol at an elevated temperature, one of said reactants and the ester produced having a boiling point above the temperature of reaction in presence of the other reactant and the other of said reactants having a boiling point below the reaction temperature in presence of said one reactant and said ester, the improvement, which comprises flowing a stream of said higher boiling reactant in liquid phase downwardly through a reaction zone, flowing a stream of said lower boiling reactant in vapor phase and intimately mixed with an inert entrainer gas through said zone countercurrent to said first mentioned stream, maintaining temperature and pressure conditions in said zone to maintain said first mentioned stream and the ester produced by the esterification reaction in liquid phase, but to maintain said second mentioned stream in vapor phase, intimately commingling said streams in said zone in the presence of a catalyst to cause said acid and alcohol to react and produce esters whereby said stream of said lower boiling reactant first contacts a liquid product composed largely of esters and last contacts a liquid product of said unreacted higher boiling reactant, retaining said higher boiling reactant in said zone for a length of time sufficient for the desired degree of esterification to take place and withdrawing the esterified higher boiling reactant from said zone at a locus near the locus of introduction of said lower boiling reactant and withdrawing any unreacted lower boiling reactant, together with said inert entrainer gas and water produced in the esterification reaction, at a locus near the locus of introduction of the higher boiling reactant.

7. The method defined in claim 1 in which the reactant having a boiling point above the temperature of reaction is the acid to be esterified.

JOHN HAROLD PERRINE.
JOHANNES H. BRUUN.

REFERENCES CITED

The following references are of record in the file of this patent:

UNITED STATES PATENTS

| Number | Name | Date |
| --- | --- | --- |
| 1,697,295 | Van Schaack | Jan. 1, 1929 |
| 1,881,563 | Held | Oct. 11, 1932 |
| 1,898,687 | Rice | Feb. 21, 1933 |
| 2,001,926 | Torok | May 21, 1935 |
| 2,053,029 | Guinot | Sept. 1, 1936 |

FOREIGN PATENTS

| Number | Country | Date |
| --- | --- | --- |
| 234,458 | Great Britain | Apr. 29, 1926 |
| 465,983 | Great Britain | May 20, 1937 |
| 493,131 | France | Apr. 19, 1919 |